United States Patent [19]

Kreucher et al.

[11] Patent Number: 5,408,828
[45] Date of Patent: Apr. 25, 1995

[54] INTEGRAL CAST DIFFUSER FOR A CATALYTIC CONVERTER

[75] Inventors: John E. Kreucher, Davison; Daniel W. Wendland, Rochester Hills; Richard S. McClaughry, III, Grand Blanc; Ramesh C. Shah, Novi, all of Mich.

[73] Assignee: General Motors Corporation, Detroit, Mich.

[21] Appl. No.: 163,792

[22] Filed: Dec. 10, 1993

[51] Int. Cl.6 .............................................. F01N 3/28
[52] U.S. Cl. .................................... 60/299; 422/176
[58] Field of Search ................ 60/299, 302; 422/176, 422/180

[56] References Cited

U.S. PATENT DOCUMENTS

| | | | |
|---|---|---|---|
| 3,597,165 | 8/1971 | Keith | 60/299 |
| 3,952,507 | 4/1976 | Bonarski | 60/278 |
| 3,984,207 | 10/1976 | Abthoff | 60/299 |
| 4,002,433 | 1/1977 | Oser . | |
| 4,209,495 | 6/1980 | Kobayashi et al. | 422/176 |
| 4,285,909 | 8/1981 | Mizusawa et al. | 422/179 |
| 4,783,959 | 11/1988 | Sickels | 60/299 |
| 4,843,815 | 7/1989 | Smojver | 60/299 |
| 5,110,560 | 5/1992 | Presz, Jr. et al. | 422/176 |
| 5,161,370 | 11/1992 | Brew | 60/299 |
| 5,184,464 | 2/1993 | Harris | 60/299 |
| 5,185,998 | 2/1993 | Brew | 60/299 |
| 5,212,949 | 5/1993 | Shiozawa | 60/302 |

Primary Examiner—Douglas Hart
Attorney, Agent, or Firm—Cary W. Brooks

[57] ABSTRACT

The present invention includes an automotive exhaust system including a catalytic converter having a substrate of substantial surface area and having a catalyst composition carried thereon. The catalytic converter substrate is carried in a housing extending the length of the catalytic converter substrate and conforming to the outer surfaces of the substrate and/or any mounting material. A two-wall diffuser is connected by an outer wall to the converter housing at one end and to an exhaust pipe at the other. An inner wall is spaced a distance from the outer wall and defines a diffuser portion having an inlet cross-section area less than its outlet cross-section flow area. The inner wall also defines an abrupt expansion section which is provided between the end of the diffuser section and the end of the inner wall nearest the substrate. The inner wall ends in the region between the substrate and the converter housing and is free-floating and is not rigidly connected to the converter substrate or housing. Thus, the inner wall is free to move with thermal cycling associated with operation of the automobile combustion engine. The space provided between the inner wall and the outer wall of the diffuser provides a thermal insulating air barrier which limits the thermal expansion and contraction the outer wall experiences at its mechanical connections to the converter housing and exhaust pipe.

3 Claims, 1 Drawing Sheet

INTEGRAL CAST DIFFUSER FOR A CATALYTIC CONVERTER

FIELD OF THE INVENTION

This invention relates to automotive and truck exhaust systems including a diffuser on the inlet end of an automotive catalytic converter. More particularly, this invention relates to an exhaust system having an integral cast, double-wall diffuser for the inlet end of a catalytic converter.

BACKGROUND OF THE INVENTION

Diffusers are well known in the art. A diffuser is a device for reducing the velocity and increasing the static pressure of a fluid passing through the same such as in an automotive exhaust system. Diffusers of this type have an inlet cross-sectional flow area that is less than their outlet cross-sectional flow area. Often, diffusers are used for the specific purpose of reducing fluid velocity or increasing fluid pressure. However, the use of a diffuser may be dictated simply by the physical requirements of the exhaust system such as increasing the cross-sectional flow area of a passage in order to connect sections of different cross-sectional area. This is the situation wherein a small diameter exhaust pipe is connected to a larger diameter housing for a catalytic converter. However, such diffusers which are dictated by the physical connection between pipes of different sizes do not necessarily allow for accurate control of fluid velocity and pressure to achieve optimum performance of an automotive combustion engine or its catalytic converter.

An automotive catalytic converter is used to decrease exhaust emissions by converting carbon monoxide, nitrogen oxides, and unburned hydrocarbons to more innocuous compounds. The catalytic converter includes a substrate which carries a catalyst for converting the exhaust emissions. Suitable catalysts are known to those skilled in the art and include for example platinum-containing compositions. For platinum-containing compositions or compositions including other expensive metals it is important to utilize the catalytic converter in the most efficient manner. Thus, it is important to adjust the flow characteristics to provide a uniform velocity distribution across the substrate cross-section so that the expensive catalyst can convert the emissions while utilizing the smallest amount of catalyst carried on the catalytic converter substrate.

The uniform velocity field at the substrate inlet face is also desirable because it leads to the smallest pressure loss across the converter for a given substrate geometry and engine flow. High pressure loss leads directly to increased engine back pressure which results in reduced engine power at high load and reduced fuel economy.

The catalytic converter substrate usually is carried by a housing having a cross-sectional area substantially greater than that of the exhaust pipe running from the combustion engine to the catalytic converter. Accordingly, the catalytic converters are often built with a converter inlet snorkel. The snorkel has a larger cross-sectional area at one end where it is connected to the housing surrounding the catalytic converter substrate and a smaller cross-sectional area at the other end where the snorkel is connected to the exhaust piping coming from the automotive engine. The snorkel may have a variety of shapes such that a cross-section may be circular, elliptical, rectangular or otherwise. Although the catalytic converter snorkel in a very broad sense is a diffuser, the dimensions of the snorkel are defined solely by the physical requirements of connecting the larger cross-section housing for the catalytic converter to the smaller diameter exhaust pipe leading from the automotive engine. Thus, the snorkel does not necessarily define a diffuser which will meet the objectives of providing a sufficiently uniform converter-inlet velocity distribution (and hence the largest and most uniform residence time) to convert the exhaust emissions utilizing the smallest amount of expensive metal catalyst carried on the ceramic substrate.

Single-wall diffusers which connect from the exhaust pipe to the outer shell of the catalytic converter housing often suffer from thermal fatigue and creep. Hot exhaust gases directly contact the diffuser where it makes mechanical connection to the catalytic converter housing and the exhaust pipe. The thermal cycling associated with this portion of the diffuser results in thermal stresses on the connections and results in reduced durability of such an exhaust system. Further, a single-wall diffuser conducts heat to the catalytic converter housing which degrades the performance and durability of the mounting insulation between the housing and the ceramic substrate.

The present invention overcomes the deficiencies of the prior art by providing a two-wall diffuser integral cast construction as described below.

SUMMARY OF THE INVENTION

The present invention includes an automotive exhaust system including a catalytic converter having a substrate of substantial surface area and having a catalyst composition carried thereon. The catalytic converter substrate is carried in a housing extending the length of the catalytic converter substrate and conforming to the outer surfaces of the substrate. The catalytic converter housing and the substrate may be separated circumferentially by a mat, metal mesh, or other substrate mounting and sealing provisions. A two-wall diffuser is connected by an outer wall to the converter housing at one end and to an exhaust pipe at the other. An inner wall is spaced a distance from the outer wall and defines a diffuser portion having an inlet cross-sectional flow area less than its outlet cross-sectional flow area. The inner wall also defines an abrupt expansion section which is provided between the end of the diffuser section and the end of the inner wall nearest the substrate. The inner wall has a free-floating end that is not rigidly connected to the converter substrate or housing. Thus, the inner wall is free to mow with thermal cycling associated with operation of the automobile combustion engine. The space provided between the inner wall and the outer wall of the diffuser provides a thermal insulating air barrier which limits the thermal expansion and contraction the outer wall experiences at its mechanical connections to the converter housing and exhaust pipe. The thermal insulating air barrier also serves to reduce the temperature of the outer wall, thus providing both heat loading and safety advantages and reduced noise radiated from the outer wall.

These and other objects, features and advantages of the present invention will be apparent from the following brief description of the drawings, detailed description and appended claims and drawings.

DETAILED DESCRIPTION

Figure 1:
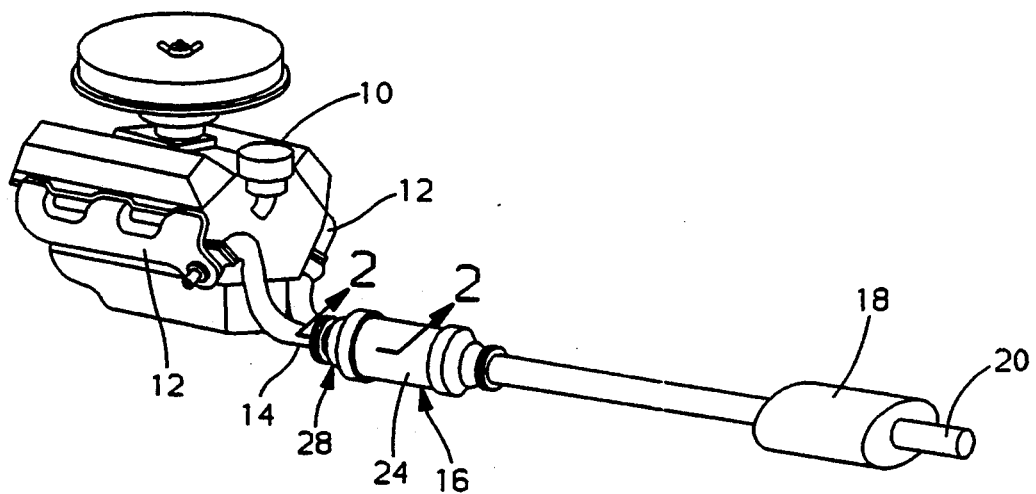
FIG. 1 illustrates an automotive exhaust system including a combustion automotive engine wherein exhaust emissions flow from the engine through an exhaust manifold, catalytic converter, muffler and out the tailpipe.

An automobile exhaust system according to the present invention includes a combustion engine 10 which operates on combustible fuel such as gasoline and/or alcohol, or similar combustible fuels known to those skilled in the art. Exhaust from the combustion engine is directed through an exhaust manifold 12 into an exhaust pipe 14 which is connected to one or more catalytic converters 16. For some engines (e.g., V6, V8), two manifolds direct exhaust gas to one or more catalytic converters. The exhaust emissions flow from the catalytic converter to a muffler 18 (and other silencing components) and out the tailpipe 20 of the exhaust system. The catalytic converter includes one or more substrates 22 with significant surface area on which a catalytic converter composition is carried. The catalytic converter composition may take a variety of forms but often includes a metal such as platinum. The catalytic converter substrate(s) are carried in a housing 24 conforming to the outer surface of the substrate. The housing may also contain provisions for mounting material 26 between the substrate 22 and the inner wall of the housing 24. A single-piece integral cast two-wall diffuser 28 is attached to the housing 24 at the substrate inlet end. The two-wall diffuser has an outer wall 30 which is mechanically connected to the housing at one end 32 by weld 33 and an engine exhaust pipe at the other end 34. At a location nearer the connection of the outer wall to the exhaust pipe, an inner wall 36 branches away from the outer wall and defines a diffuser section (between points A and B) having an inlet cross-sectional area which is less than the outlet cross-sectional area. The walls of the diffuser portion are straight (or flat). The diffuser has an half-angle theta ($\theta$) which is defined by the angle formed by a line taken parallel to the first portzion of the exhaust pipe which has a consistent diameter and a line parallel to the portion of the inner wall defining the diffuser portion. Preferably $\theta$ ranges from about 1° to about 20°. A second portion of the inner wall defines an abrupt expansion section 40 for flow of the exhaust gas. The abrupt expansion section (between points B and C) has a half-angle beta ($\beta$) which ranges from about 30° to about 90° and is substantially larger than the half-angle $\theta$ of the diffuser portion. One end 42 of the inner wall extends into the annulus region between the substrate 22 and the catalytic converter housing 24 where it comes in contact with the mounting material 26. This end 42 of the inner wall does not mechanically connect to the substrate or to the converter housing and thus is free-floating. A space 44 is provided between the inner and outer walls of the integral cast diffuser, which provide a thermal insulating air gap. When exhaust gas flows through the integral cast diffuser, thermal stresses are borne primarily by the inner wall which is allowed to expand and contract due to its free-floating end. The air gap insulator limits the temperature or heat experienced by the outer wall and thus substantially less thermal stress is experienced at the mechanical connections of the diffuser to the housing and the exhaust pipe.

Figure 2:
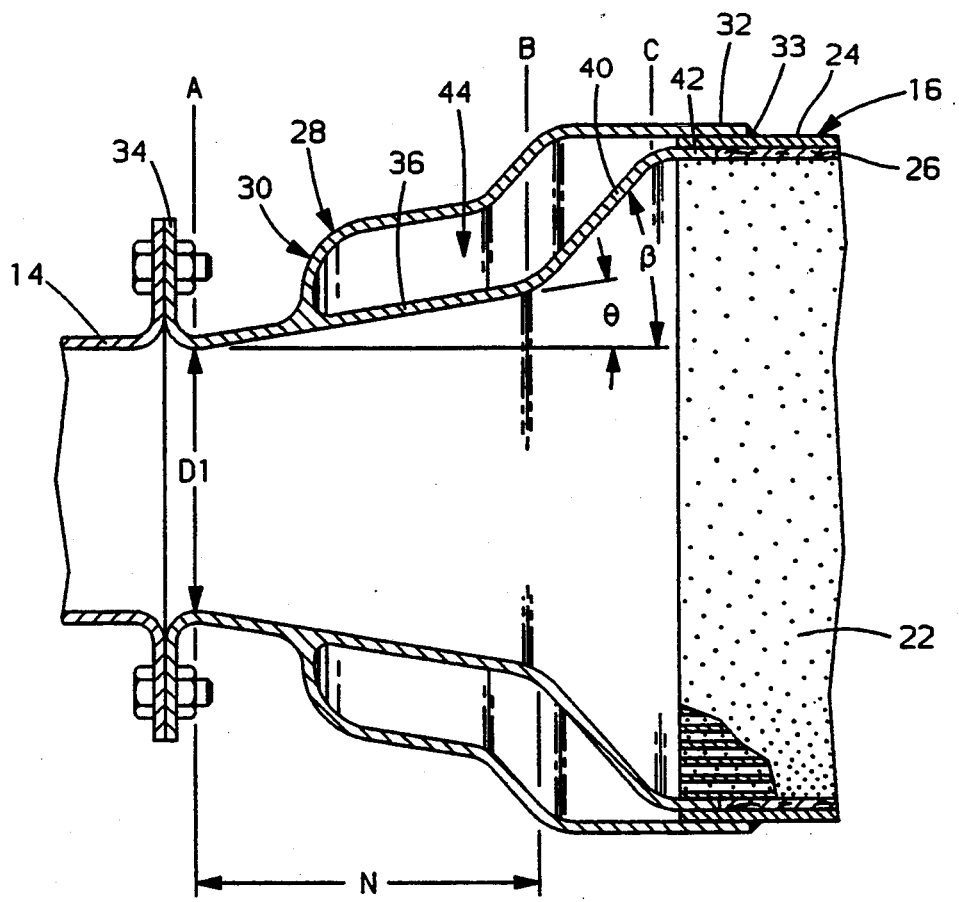
FIG. 2 is a sectional view along line 2—2 of FIG. 1 of an automotive exhaust system including a catalytic converter substrate housing with an integral cast two-wall diffuser for the inlet end of the converter according to the present invention.

For a typical passenger-car application, exhaust gas flowing through the diffuser sees a cross-sectional area at point A of about 3 inches$^2$ at the first end of the diffuser where it is connected to the exhaust pipe. A cross-sectional area at point B of about 7 inches$^2$ at the second end of the diffuser section and cross-sectional area at point C of about 20 inches$^2$ in the abrupt expansion section near the converter substrate. A diffuser portion may have a length N and an inlet diameter D1, as shown in FIG. 2. For improved performance the dimensions D1, $\theta$, and N are defined by the following relationship $\theta \leq 14(N/D1)^{-0.54}$. The diffuser geometry is preferably designed within the constraints of our design equation in order to provide a system with minimum pressure losses equating the maximum engine performance (power and fuel economy). The integral cast two-wall diffuser construction may be formed by casting a material such as stainless steel.

The embodiments of the invention in which an exclusive property or privilege is claimed as defined as follows:

1. An exhaust system for a combustion engine comprising a catalytic converter comprising a substrate having a catalyst carried thereon, a housing carrying the substrate and conforming substantially to the outer surface of the substrate, and a single-piece integral cast two-wall diffuser having an outer wall connected to the housing at one end and connected to an engine exhaust pipe at the other end, an inner wall branching away from the outer wall at a location near the connection of the outer wall to the engine exhaust pipe, the inner wall constructed and arranged to define a diffuser having an inlet cross-sectional area that is less than the outlet cross-sectional area.

2. An exhaust system as set forth in claim 1 wherein said inner wall has a free-floating end not mechanically connected to the converter housing.

3. An exhaust system as set forth in claim 1 wherein said diffuser has a length N, a half angle $\theta$ and an inlet diameter D, defined by relationship $\theta \leq 14(N/D1)^{-0.54}$.

* * * * *